June 12, 1962 E. G. LILL 3,038,737
HANDLE FOR ROTARY LAWN MOWER
Filed March 10, 1958 2 Sheets-Sheet 1

INVENTOR.
Etchison G. Lill
BY
George R. Clark
Atty.

June 12, 1962  E. G. LILL  3,038,737
HANDLE FOR ROTARY LAWN MOWER
Filed March 10, 1958  2 Sheets-Sheet 2
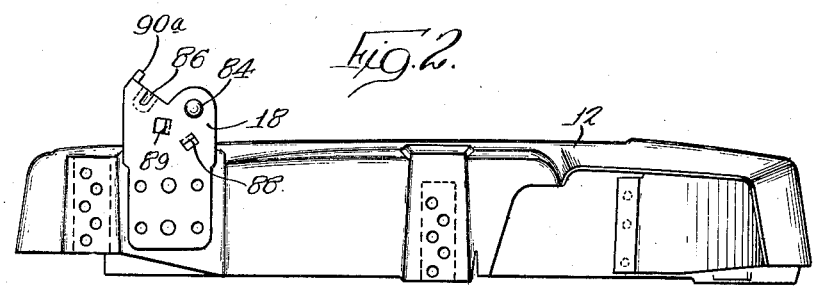
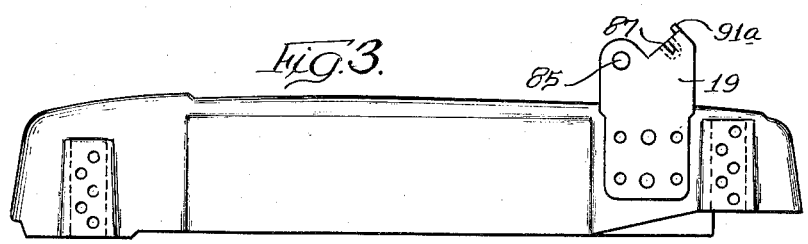
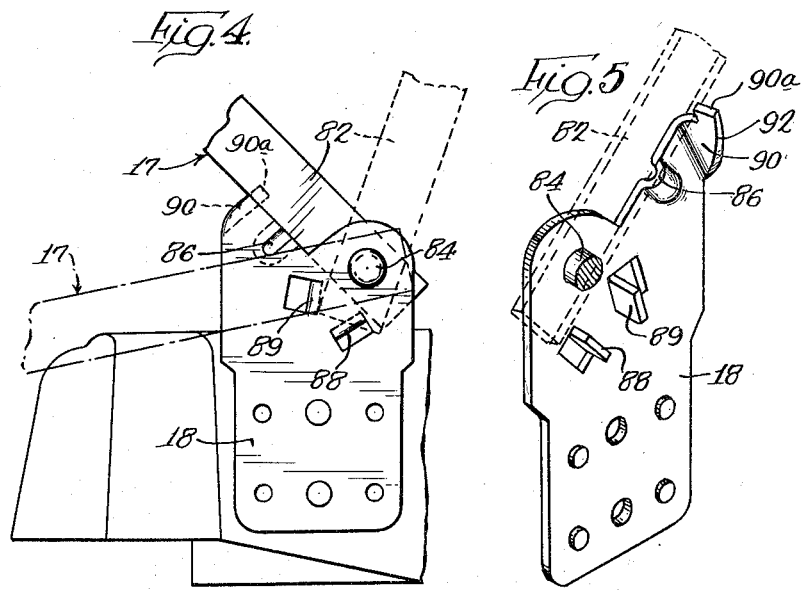
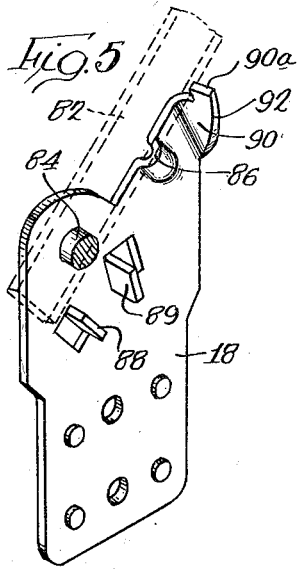
INVENTOR.
Etchison G. Lill
BY
George R. Clark
Atty.

United States Patent Office 3,038,737
Patented June 12, 1962

3,038,737
HANDLE FOR ROTARY LAWN MOWER
Etchison G. Lill, Wheaton, Ill., assignor to Sunbeam Corporation, Chicago, Ill., a corporation of Illinois
Filed Mar. 10, 1958, Ser. No. 720,485
9 Claims. (Cl. 280—47.37)

This invention relates to a lawn mower, and more particularly to a rotary lawn mower.

Mowers of the rotary type are conventionally provided with a handle pivotally mounted on the housing at an angle relative thereto and movable between stops which permit limited movement of the handle. Within this range of limited movement, the handle is always at a convenient angle for pushing or guiding the mower. Mowers are usually stored in a garage or in a similar area where space is at a premium so that when the handle projects at an angle relative to the mower housing, the mower occupies a large amount of space. It would be desirable to provide a mower in which the handle may be moved easily from an inclined position relative to the housing to a position where the handle lies in a plane substantially perpendicular to that of the mower blade for convenient storage. With such an arrangement the handle does not occupy a large amount of space at one end of the mower, but is positioned directly over the mower so that the only space required for storage is the actual floor space occupied by the housing itself. Also, it would be desirable to be able to store the mower by hanging it on a wall with the mower housing lying flat against the wall.

It is accordingly an object of the invention to provide an improved handle and mounting arrangement for a rotary lawn mower.

It is another object of the invention to provide a rotary lawn mower having a structurally simple and functionally improved handle and handle mounting arrangement.

Yet another object of the invention is to provide a rotary mower in which the handle may be selectively moved to several positions. In one of the positions, the handle extends directly over the housing. In another position, the handle extends at an angle to the housing so that it is in a position convenient for pushing and guiding the mower in use. In a third position, the handle extends substantially directly away from one end of the mower housing so that the handle may be suspended from a wall bracket and support the mower housing in a vertical position.

A further object of the invention is to provide a rotary mower having handle mounting brackets in which pins extend toward one another pivotally to support the handle. The brackets also are provided with notched stops restricting the movement of the handle and the pins are sufficiently long so that the handle straps may be pressed toward one another to clear the notched stops of the brackets so that the handle can be moved to a horizontal position parallel with the mower housing without disengaging the straps from the pins. The brackets are also provided with a stop limiting upward movement of the handle when the handle is in an inclined position, which stop may be cleared by pressing the straps toward one another on the pins to permit the handle to be moved to a vertical position over the mower. A further stop is also provided to hold the handle in the vertical position.

Other objects of the invention will become apparent from the following detailed description of a rotary mower forming a specific embodiment thereof, when read in conjunction with the appended drawings, in which:

FIG. 2 is a side elevation of the housing of the mower shown in FIG. 1;

FIG. 3 is a side elevation of the housing showing the side of the housing opposite to that shown in FIG. 2;

FIG. 4 is an enlarged, fragmentary side elevation of a mounting bracket mounting the handle of the mower on the mower housing;

FIG. 5 is an enlarged fragmentary, perspective view of the handle mounting bracket shown in FIG. 4.

Figure 1:
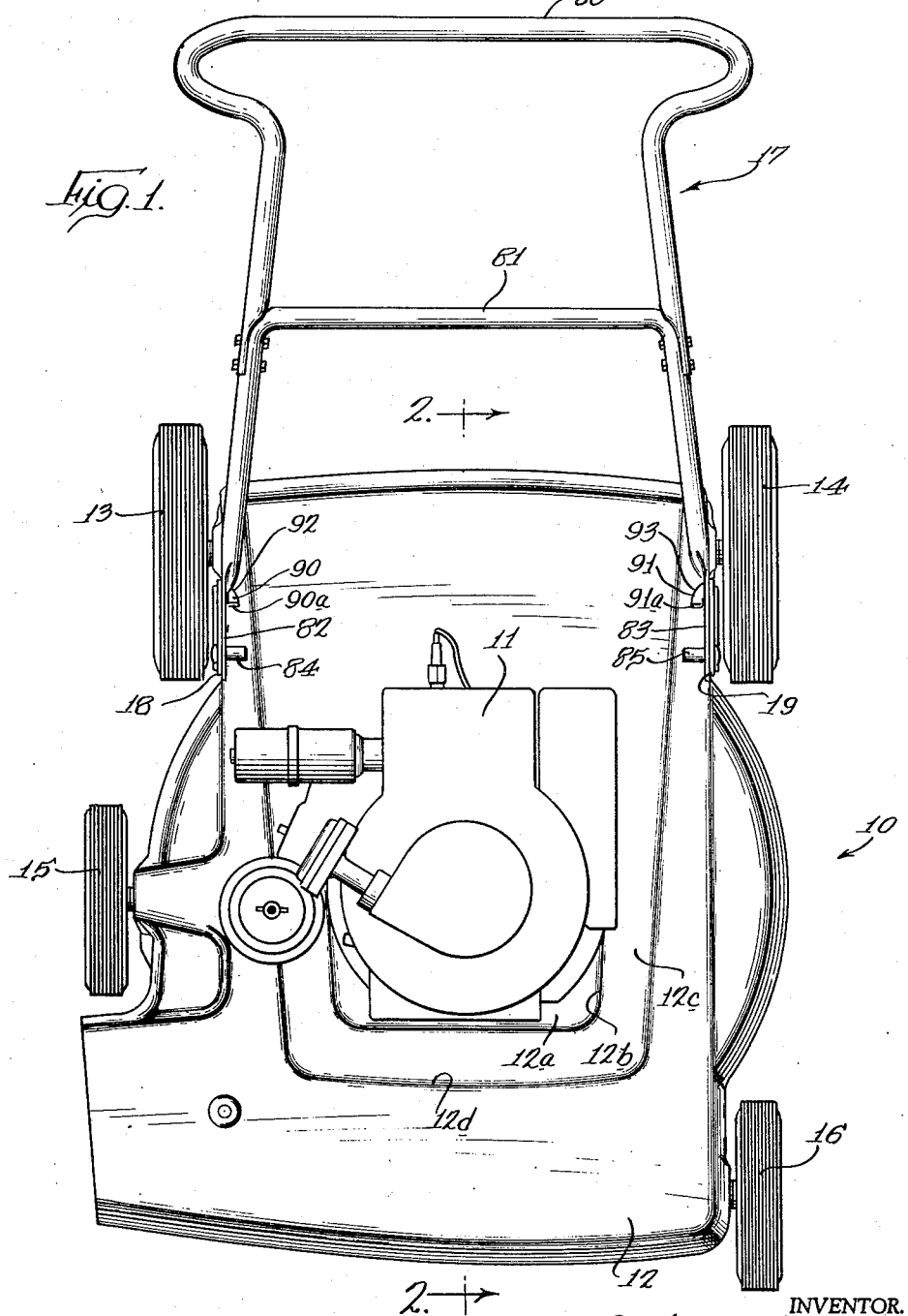
FIG. 1 is a top plan view of a rotary mower forming one embodiment of the invention.

The invention provides a rotary mower including a drawn sheet metal housing having a top deck supporting the motor and having depending side walls formed with a discharge chute or opening at a front side corner thereof. The mower is provided with a handle, the mounting brackets for which are secured to opposite sides of the housing. The handle can be selectively located in an operative position in which the handle projects rearwardly at an angle to the housing, in a permanent storage position in which the handle extends rearwardly parallel to the housing for storing the mower on a wall, and in a temporary storage position in which the handle extends directly vertically over the mower. The bracket structure permits the handle readily to be moved from one position to another without disengagement of the handle from the brackets.

Referring more specifically to the drawings, there is shown therein a rotary mower 10 which includes a conventional gasoline engine 11 mounted on a housing 12. The housing 12 is formed from a sheet steel stamping and is supported by wheels 13, 14, 15 and 16. The mower is manipulated by the user by means of a handle 17 (FIG. 1) which is pivotally mounted on the housing 12 by means of handle brackets 18 and 19. The brackets 18 and 19 are spot welded to the sides of the housing 12 near the rear of the housing.

In order to permit the blade supporting shaft of the lawn mower to be as short as possible and also to stiffen the deck or upper portion of the housing 12, the upper portion of the housing 12 has an upwardly facing cup-shaped portion 12a serving to support the engine 11. Walls 12b act as stiffening webs to strengthen the housing. An outer generally cup-shaped portion 12c surrounding the portion 12b provides rigidity to the top or deck of the housing 12, keeps the mounting of the engine 11 low with respect to the ground and imparts an attractive appearance to the housing. Walls 12d of the portion 12c also help to strengthen the top of the housing 12.

In order to provide a convenient, stable and rigid mounting structure for the wheels 13, 14, 15 and 16, the housing 12 is generally rectangular in construction. This arrangement gives an attractive appearance and also permits the wheels 15 and 16 to be spaced sufficiently far from the wheels 13 and 14 to provide stability for the mower by avoiding top heaviness of the housing 12 and motor 11 mounted on the top of the housing.

The brackets 18 and 19 serve to permit the handle 17 to be moved to any one of the three different positions illustrated in FIG. 4. When the mower is to be used for mowing grass or mulching leaves, the handle 17 preferably is in an operative position as illustrated in full lines in FIGURE 4, in which position the handle is inclined upwardly and to the rear of the mower. The handle includes generally tubular U-shaped portions 80 and 81 which are connected together with the legs of both U-shaped portions extending in the same direction and generally parallel with one another. The gripping portion of the handle is formed by the bight portion of the U-shaped member 80. To pivotally mount the handle 17 to the mower housing, the ends of the legs of U-shaped member 81 are provided with flat strap-like portions 82 and 83 having holes therein for receiving mounting pins 84 and 85 which are rigidly fastened to the plates 18 and 19, respectively.

To position the handle 17 at the proper angle for mowing, a pair of stops 86 and 87 are formed by pressing out portions of the plates 18 and 19, respectively, along the upper edge thereof so that they are in the paths of the flat end portions 82 and 83, respectively. To supplement the stops 86 and 87, additional stops 90 and 91 are formed on the handle brackets 18 and 19 by folding inwardly the upper rear corners of the handle brackets. The stops 90 and 91 lie in the same plane as the stops 86 and 87 and are designed to engage the handle end portions 82 and 83 simultaneously. Since the material of which the handle brackets 18 and 19 and the portions 82 and 83 are formed is fairly light steel, it was found to be desirable to increase the area of contact between the stops and the handle portions 82 and 83 so that excessive wear would not occur. Such wear would change the angular position of the handle in its operative position and be extremely undesirable.

To provide for limited movement of the mower handle when in its operative position, a stop member 88 is formed in handle bracket 18 at a position spaced slightly from handle portion 82 when resting against stops 86 and 90. The stop 88 is merely punched out of bracket 18 and extends inwardly perpendicular thereto as can be best seen in FIGS. 4 and 5. Since the stop 88 is spaced from the handle portion 82 when against stops 86 and 90, the upper end of the handle may be swung upwardly somewhat by an operator until the end portion 82 engages the stop 88. This limited movement is desirable because of the different angles of the handle which are found to be convenient by different operators of the mower.

When it is desired to store the mower temporarily in the garage or other suitable place of storage so that the mower occupies a minimum of floor space, the end portion 82 in the lower handle member 81 is pressed inwardly along the mounting pin 84 until the portion 82 clears the stop 88. It should be understood that ends 82 and 83 of the U-shaped handle portion 81 are normally positioned against the handle brackets 18 and 19. Because of the resilience of handle portion 81, the legs of the U-shaped member may be deflected inwardly to avoid the stop 88. After the stop 88 has been cleared, the handle 17 may be swung in a clockwise direction, as viewed in FIG. 4, from its full-line position as shown therein to its dotted-line position where the lower end of the portion 82 engages a tab stop 89 punched out of the plate 18. Since the tab stop 89 is longer than the tab stop 88, the lower end of the portion 82 of the handle 17 may bear against the stop 89 even though it is riding on top of the stop 88. When engaged with the stop 89, the handle is held in its generally vertical temporary storage position. In this position, the handle is tilted somewhat forwardly over the mower engine and housing so that gravity will tend to maintain the handle in engagement with stop 89. When the mower is again to be used, the handle need only be pivoted from its temporary storage position to the operative position thereof. While in the near vertical or storage position, the end 82 of the handle rides on the top of stop 88 and continues in such deflected position until the handle is rotated to the operative position. When the handle reaches the operative position, the outward spring bias of the legs of U-shaped member 81 moves the end 82 back against bracket 18 as soon as it is disengaged from the outwardly extending end of stop 88.

When the mower handle 17 is in the operative position, the stops 86, 87, 90 and 91 restrain the handle against downward pivotal movement about the handle brackets. With the handle so restrained against movement relative to the mower housing, the handle may be used as a lever for lifting the front end of the mower by pivoting the housing about its rear wheels. This lifting of the front of the lawn mower is frequently necessary in normal operation to avoid objects on the lawn, to start up inclines, to cross small depressions in the lawn, etc. To hold the portions 82 and 83 of the handle against sliding off the stops 86, 87, 90 and 91, the stops 90 and 91 are provided with upwardly extending guide tabs 90a and 91a, respectively, which project upwardly from the surface of stops 90 and 91 on the inside of the portions 82 and 83 to prevent lateral movement of the portions 82 and 83 when the handle 17 is in the operative position. As may best be seen in FIGS. 4 and 5, the guide tabs 90a and 91a form notches within which the handle portions 82 and 83, respectively, are received. Thus, when the handle is resting against the stops 86, 87, 90 and 91, the ends 82 and 83 of the U-shaped handle portion 81 are restrained between the handle brackets 18 and 19 and the guide tabs 90a and 91a.

When it is desired to hang the mower on the wall or the like, the handle is pivoted upwardly slightly and the end portions 82 and 83 of the handle are pressed inwardly to positions clearing the tabs 90a and 91a. The handle may then be pivoted downwardly from its full-line position illustrated in FIG. 4 to its substantially horizontal broken-line position shown therein in which the handle extends rearwardly and somewhat downwardly. With the handle in this position, the mower can be hung by the handle, with the mower lying flat against the wall. To move the handle to this position, both the portion 82 and the portion 83 are biased inwardly against the resilience of the U-shaped handle member 81 to positions clearing guide tabs 90a and 91a, and the handle is swung downwardly until the handle has moved below the tabs 90a and 91a. The pins 84 and 85 are sufficiently long so that the handle portions 82 and 83 remain on the pins when the portions 82 and 83 are moved inwardly sufficiently to clear the tabs 90a and 91a. Then, when it is desired to move the handle back from its horizontal or rearwardly extending position to its operative position, the handle need only be swung in a clockwise direction, as viewed in FIG. 4. As can be seen in FIGS. 4 and 5, the handle moves downwardly under the stop 89 to arrive at its lowermost position. The stop 89 is slightly lower in height than tab 90a so that the handle portion 82 may clear the stop 89. To avoid the necessity of biasing the end portions 82 and 83 inwardly when rotating the handle back to the operative position, the stops 90 and 91 are formed with cam surfaces 92 and 93 at their lower rearward edges. In such movement of the handle, cam surfaces 92 and 93 cam the portions 82 and 83 of the handle inwardly against the biasing force exerted by the U-shaped handle portion 81. After moving over both the guide tabs 90a and 91a, the portions 82 and 83 spring outwardly again before the end of the portion 82 engages the stop 88. This arrangement of stops and cam surfaces on the handle support bracket provides a structurally simple mechanism for pivotally mounting a handle so that it has limited movement in the operating position and may be readily moved to either one of two storage positions.

While there has been shown and described a particular embodiment of the present invention, it will be apparent to those skilled in the art that numerous modifications may be made without departing from the invention in its broader aspects, and it is therefore aimed in the appended claims to cover all such changes and modifications as fall within the true spirit and scope of the present invention.

What is claimed as new and desired to be secured by Letters Patent of the United States is:

1. In a mower including an inverted cup-shaped housing having side walls and wheels supporting said housing, the combination therewith of a handle having spring arms at the lower portion thereof, a pair of brackets secured in upstanding positions to the side walls of said housing, pin means securing said arms pivotally to said brackets, each of said brackets having a notch radially spaced from the axis of said pin means and disposed in the path of pivotal movement of said handle for receiving a respective one of said arms to hold said handle in an inclined position relative to said housing, a first stop pressed from one of said brackets for limiting upward movement of said handle from said notches, said arms being movable axially along said pin means toward one another to clear said notches and permitting said handle to be moved to a position extending parallel to said housing, said pin means being sufficiently long to engage said handle and said brackets while said arms are moved toward one another to clear said notches, and a second stop extending from said one bracket adjacent said first stop for engaging one of said arms when said arms are moved to substantially vertical positions after being moved toward one another to clear said first stop.

2. In a mower including an inverted cup-shaped housing having side walls and wheels supporting said housing, the combination therewith of a handle having spring arms at the lower portion thereof, a pair of brackets secured in upstanding positions to the side walls of said housing, transversely disposed pin means securing each said arm pivotally to said brackets, each of said brackets having an inwardly turned and upwardly extending guide radially spaced from the axis of said pin means and disposed in the path of pivotal movement of said handle for receiving a corresponding one of said arms to hold said handle in an inclined position relative to said housing, a first stop pressed from one of said brackets for limiting upward movement of said handle from said guides, said arms being movable toward one another to clear said guides and permitting said handle to be moved to a position extending parallel to said housing, each of said guides being provided with cam surfaces on the under surface thereof and serving to permit said handle to be moved upwardly from said horizontal position past said guides, said pins being sufficiently long to engage said handle and said brackets while said arms are moved toward one another to clear said guides, and a second stop extending from said one bracket and spaced in closely spaced relationship to said first stop for engaging said one of said arms when said arms are moved to substantially vertical positions after being moved toward one another to clear said first stop and subsequently pivoted on said pin means.

3. In a rotary mower, a mower housing, a pair of brackets fixed in upstanding opposed positions to said housing, a pair of pins mounted on said brackets in aligned positions, one of said brackets being provided with a first and a second stop means positioned in radially spaced relation around one of said pins, a handle having end portions provided with aligned bores fitting over said pins, said end portions being movable toward each other relative to one another, said first and second stop means projecting from said bracket parallel to said one pin with said pin being longer than said first and second stops and said second stop being longer than said first stop to permit the handle to be moved on that pin and pivoted past said first stop into engagement with said second stop while still on said pin and to permit the handle to be moved past said second stop while still on said pin to move said handle to a position past said second stop.

4. In a rotary mower, a mower housing, a pair of brackets fixed in upstanding opposed positions to said housing, a pin mounted on each of said brackets in aligned inwardly directed positions, each of said brackets being provided with a stop projecting toward the other bracket, a handle having end portions provided with aligned bores fitting over said pins, said end portions being movable toward one another, said stops serving to support said handle in an angular position relative to said housing, said stops being radially spaced from the axis of said pins and disposed in the path of pivotal movement of said handle, said stops projecting from said brackets a distance less than the length of the pin adjacent thereto to permit the handle to be moved inwardly on that pin and pivoted past said stops while still on said pin to move said handle to a horizontal position, and guide tabs on the inner ends of said stops extending inside of said handle portions when said portions are in engagement with said stops, said guide tabs limiting said movement toward one another of said handle portions until said handle has been pivoted upwardly to clear said guide tabs.

5. A lawn mower comprising a housing and wheels supporting said housing, a pair of handle brackets secured to said housing in parallel spaced relation, an inverted U-shaped handle having spring arms at the lower portion thereof, inwardly extending pins secured to said brackets and pivotally supporting said handle arms, said spring arms biasing the lower portions thereof into engagement with said brackets, first stop means extending inwardly from each of said handle brackets, said first stop means being radially spaced from the axis of said pins and disposed in the path of pivotal movement of said handle for supporting said handle in an inclined position, second and third inwardly extending stop means on one of said handle brackets radially spaced from one of said first stop means and from each other, and said pins extending inwardly a greater distance than any of said stop means so that said handle portions may be moved inwardly deflecting said spring arms to pass over said stop means without being disengaged from said pins, said handle portions being disengageable from said pins by moving them off the inner ends of said pins.

6. A lawn mower comprising a housing and wheels supporting said housing, a pair of handle brackets secured to said housing in parallel spaced relation, a handle having spring arms at the lower portion thereof, inwardly extending pins secured to said brackets and pivotally supporting said handle arms, first stop means extending inwardly from each of said handle brackets, said first stop means being radially spaced from the axis of said pins and disposed in the path of pivotal movement of said handle for supporting said handle in an inclined position, second and third inwardly extending stop means on one of said handle brackets radially spaced from one of said first stop means and from each other, said pins extending inwardly a greater distance than any of said stop means so that said handle portions may be moved inwardly to pass over said stop means without being disengaged from said pins, said second stop means being positioned on the other side of one of said pins from said first stop means to limit the upward movement of said handle from said inclined position, and said third stop means being positioned between said first stop means and said second stop means and extending inwardly a greater distance than said second stop means so that when said handle is moved inwardly to pass over said second stop means it is engaged by said third stop means to support said handle in a substantially vertical position.

7. In a mower including an inverted cup-shaped housing having side walls and wheels supporting said housing, the combination therewith of a handle having spring arms at the lower portion thereof, a pair of brackets secured in upstanding positions to the side walls of said housing, transversely disposed pin means securing each of said arms pivotally to said brackets, each of said brackets having an inwardly turned and upwardly extending guide posed above and longitudinally spaced from the corresponding pin means for receiving a corresponding one of said arms to hold said handle in an inclined position relative to said housing, a first stop pressed from one of said brackets and spaced radially from and below the corresponding pin means a distance less than the radial distance from said last mentioned pin means to the bottom of said corresponding spring arm for limiting upward movement of said handle from said guides, said arms being movable toward one another to clear said guides and permitting said handle to be moved to a position extending parallel to said housing, each of said guides being provided with cam surfaces on the undersurface thereof and serving to permit said handle to be moved upwardly from said horizontal position past said guides, each of said pins extending inwardly from a corresponding bracket a distance greater than the distance of the corresponding inwardly turned guide and thereby being sufficiently long to engage said handle and said brackets while said arms are moved toward one another to clear said guides, and a second stop extending from said one bracket and disposed intermediate said corresponding first stop and guide and spaced below and at a distance from said corresponding pin less than said radial distance for engaging said one of said arms when said arms are moved to substantially vertical positions, said second stop extending a distance inwardly from a corresponding one of said brackets greater than said corresponding first stop but less than said corresponding pin means whereby said substantially vertical positions are reached after said arms are moved toward one another to clear said first stop and subsequently pivoted on said pin means.

8. In a rotary mower, a mower housing, a pair of brackets fixed in upstanding opposed positions to said housing, a pin mounted on each of said brackets in aligned inwardly directed positions, each of said brackets being provided with a stop disposed at an acute angle relative to the vertical axis passing through said pin, said stop projecting toward the other bracket, a handle having end portions provided with aligned bores fitting over said pins, said end portions being movable toward one another, said stops serving to support said handle in an angular position relative to said housing, said stops projecting from said brackets a distance less than the length of the pin adjacent thereto to permit the handle to be moved inwardly on that pin and pivoted past said stops while still on said pin to move said handle to a horizontal position, and guide tabs on the inner ends of said stops extending inside of said handle portions when said portions are in engagement with said stops, said guide tabs limiting said movement toward one another of said handle portions until said handle has been pivoted upwardly to clear said guide tabs.

9. A lawn mower comprising a housing and wheels supporting said housing, a pair of handle brackets secured to said housing in parallel spaced relation, a handle having spring arms at the lower portion thereof, inwardly extending pins secured to said brackets and pivotally supporting said handle arms, first stop means extending inwardly from each of said handle brackets and spaced radially from the corresponding pin and disposed in the path of pivotal movement of the lower portion of said handle, for supporting said handle in an inclined position, second and third inwardly extending stop means on one of said handle brackets radially spaced from one of said first stop means and from each other and from the corresponding pin, said pins extending inwardly a greater distance than any of said stop means so that said handle portions may be moved inwardly to pass over said stop means without being disengaged from said pins, said second stop means being positioned on the other side of one of said pins from said first stop means and below the corresponding pin a distance less than the radial distance from said last mentioned pin to the bottom of said corresponding spring arm to limit the upward movement of said handle from said inclined position, and said third stop means being positioned between said first stop means and said second stop means, and spaced below and at a distance from said corresponding pin less than said radial distance, said third stop means extending inwardly a greater distance than said second stop means so that when said handle is moved inwardly to pass over said second stop means it is engaged by said third stop means to support said handle in a substantially vertical position.

References Cited in the file of this patent

UNITED STATES PATENTS

| | | | |
|---|---|---|---|
| 843,770 | Ruton | Feb. 12, | 1907 |
| 2,388,165 | Loewe et al. | Oct. 30, | 1945 |
| 2,564,201 | Hainke | Aug. 14, | 1951 |
| 2,617,670 | Welsh | Nov. 11, | 1952 |
| 2,650,463 | Courson et al. | Sept. 1, | 1953 |
| 2,659,191 | Miller et al. | Nov. 17, | 1953 |
| 2,716,559 | Boyce | Aug. 30, | 1955 |
| 2,724,598 | Knarzer | Nov. 22, | 1955 |
| 2,726,503 | Phelps | Dec. 13, | 1955 |
| 2,757,013 | Brier | July 31, | 1956 |
| 2,760,327 | Bovee | Aug. 28, | 1956 |
| 2,786,694 | Gray | Mar. 26, | 1957 |
| 2,791,080 | Shaw | May 7, | 1957 |
| 2,836,430 | Langenbacher | May 27, | 1958 |
| 2,922,659 | Tinder et al. | Jan. 26, | 1960 |